United States Patent [19]

Fujisawa et al.

[11] 4,227,122
[45] Oct. 7, 1980

[54] CONVERGENCE DEVICE FOR PROJECTION TYPE COLOR TELEVISION SYSTEM

[75] Inventors: Seiji Fujisawa, Ikoma; Toshitaka Yukumoto, Ibaraki, both of Japan

[73] Assignee: Matsushita Electric Industrial Co., Ltd., Japan

[21] Appl. No.: 916,529

[22] Filed: Jun. 19, 1978

[30] Foreign Application Priority Data

Jun. 23, 1977 [JP] Japan ............................ 52-83233[U]

[51] Int. Cl.$^2$ ........................ H01J 29/70; H01J 29/76
[52] U.S. Cl. .............................. 315/368; 315/13 C; 335/213; 358/60
[58] Field of Search ............... 315/13 C, 368, 370, 315/371; 358/64, 60; 335/213

[56] References Cited

U.S. PATENT DOCUMENTS

| 3,622,835 | 11/1971 | Parker | 315/13 C |
| 4,027,219 | 3/1977 | Van Alphen et al. | 315/13 C |

FOREIGN PATENT DOCUMENTS 2548117  5/1976  Fed. Rep. of Germany .......... 315/368

Primary Examiner—Theodore M. Blum
Attorney, Agent, or Firm—Stevens, Davis, Miller & Mosher

[57] ABSTRACT

In a convergence device for a three primary-color projection type color television system with three cathode-ray tubes, it is known to use two separate cores respectively for dynamic and static convergence correction. In the present invention a single core is used and the core is provided with eight pole pieces aligned along the vertical, horizontal and two diagonal axes, each pole piece having a winding therearound. The vertically and horizontally aligned pole pieces are used to correct horizontal and vertical dynamic convergence respectively. The diagonally aligned pole pieces are used for both the horizontal and vertical static convergence correction by producing magnetic fields horizontally and vertically. The construction is much simpler than the prior art, and the correction of dynamic and static convergence which is required as a result of the difference in incident angles between electron beams projected on a screen can be easily attained.

3 Claims, 8 Drawing Figures

CONVERGENCE DEVICE FOR PROJECTION TYPE COLOR TELEVISION SYSTEM

The present invention relates to a convergence device for cathode-ray tubes and, in particular, relates to a convergence device for the three primary-color projection type television system with three cathode-ray tubes.

The present invention will be made apparent by the detailed description taken in conjunction with the accompanying drawings, in which.

Figure 1:
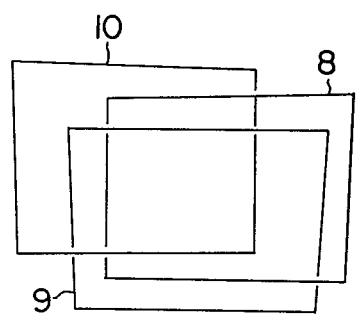
FIG. 1 is a diagram showing a general construction of a conventional color television system of the three primary-color projection type including three cathode-ray tubes and the condition of a raster projected on the screen.
Figure 1:
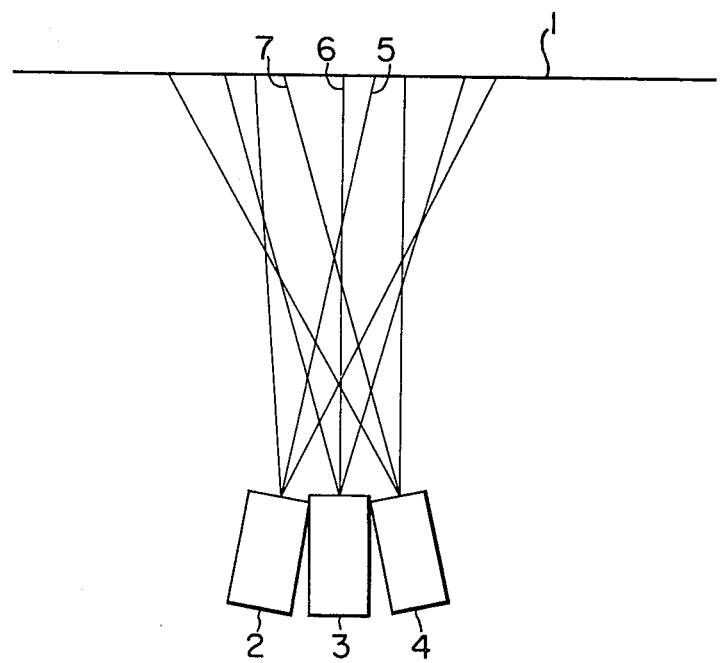

In conventional color television systems of the three primary-color projection type having three cathode-ray tubes arranged in delta form, the dynamic and static convergence are displaced due to a difference in incident angles to a projection screen among the electron beams of the three primary colors as shown in FIG. 1. In this drawing, reference numeral 1 shows a projection screen, numerals 2, 3 and 4 electron guns of the three primary colors of red, blue and green, numerals 5, 6 and 7 axes of electron beam projections by the three electron guns 2, 3 and 4 respectively, and numerals 8, 9 and 10 examples of rasters projected by the guns 2, 3 and 4 respectively.

In order to assure a clear color picture in such a system, this "displacement" is required to be corrected for locating the rasters of the three colors in substantially the same position. Both dynamic and static convergences are displaced in horizontal and vertical directions, and therefore obviously are required to be corrected in the two directions.

Figure 2:
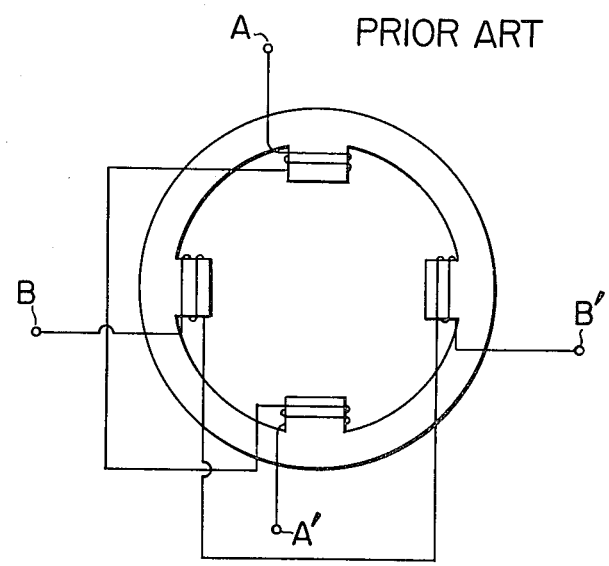
FIG. 2 is a diagram showing a convergence-correcting core used in a conventional convergence device.
Figure 3:
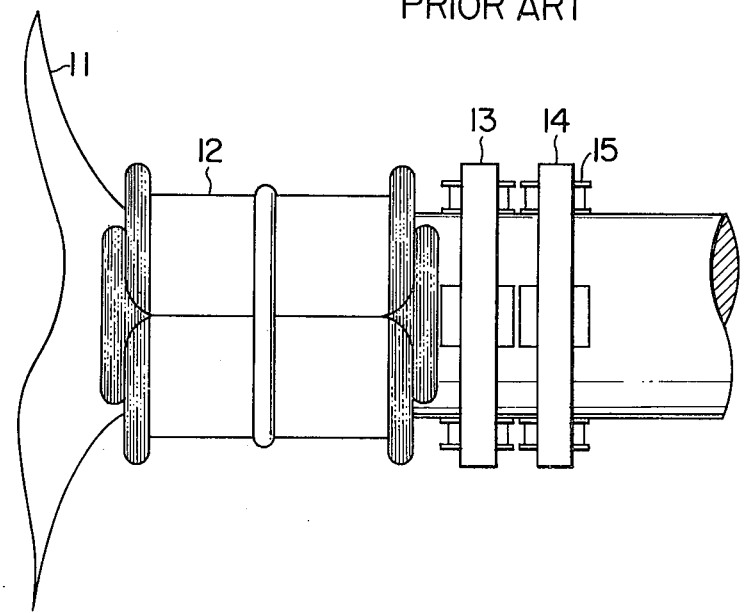
FIG. 3 is a diagram showing the construction of a conventional convergence device.

The construction of a conventional convergence-correcting core is shown in FIG. 2. Such cores for correction of dynamic and static convergences are mounted on the neck of the cathode-ray tube as shown in FIG. 3. Between A and A' and between B and B' in FIG. 2, dynamic and static convergence-correcting currents are applied for horizontal and vertical directions.

In FIG. 3, numeral 11 shows a bulb of a cathode-ray tube, numeral 12 a deflection coil, and numerals 13 and 14 dynamic and static convergence cores respectively which may be interchanged in a positional relation. Numeral 15 shows a coil bobbin.

As obvious from FIG. 3, in this case, it is necessary to provide the deflection coil, the static convergence-correcting core and the dynamic convergence-correcting core on the neck of the cathode-ray tube. Further, the directions of the magnetic fields of the cores are required to be substantially identical to the vertical and horizontal directions of the deflection coils, resulting in a very troublesome operation of mounting thereof on the neck.

Figure 4:
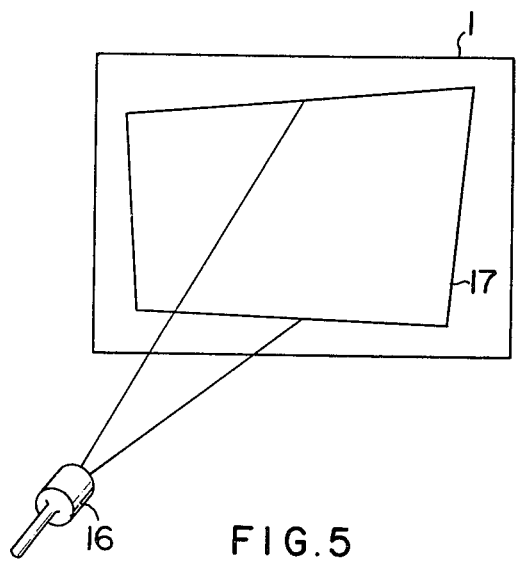
FIG. 4 is a diagram showing the distortion of the raster projected by one of the electron guns.

Now, referring to the displacement in each convergence, the displacement in dynamic convergence is caused by the fact that the electron beam from each gun is projected in a direction different from the direction perpendicular to the projection screen. The distortion of the raster projected by a particular electron gun is shown in FIG. 4. In the drawing, numeral 16 is the gun and numeral 17 the raster distorted. The electron gun 16 is arranged at an angle to the screen 1 in vertical and horizontal directions so that the raster distortion has vertical and horizontal components. Since these vertical and horizontal distortions are independent of each other, vertical and horizontal corrections may be effected separately from each other. Therefore, the core shaped as shown in FIG. 2 is used and the pole pieces are positioned in the directions identical to the vertical and horizontal directions of the deflection coils. As to the static convergence displacement, however, neither the magnitude of displacement nor direction thereof is fixed due to the mounting position or other factors. For this reason, the correction is possible without aligning a correction direction in the vertical or horizontal direction of the deflection coil unlike the dynamic convergence correction.

Figure 5:
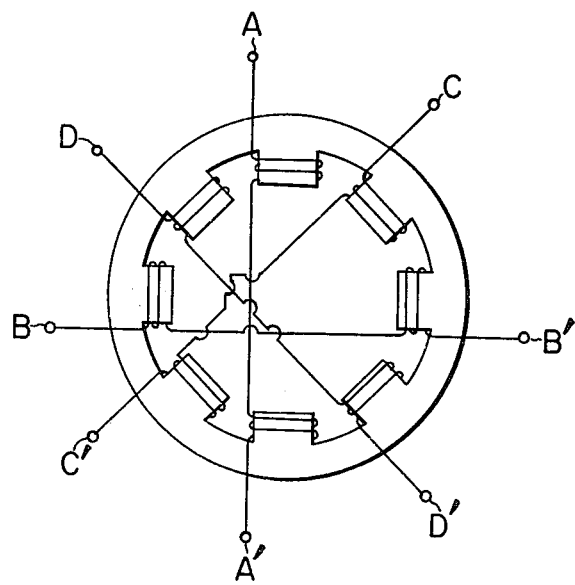
FIG. 5 is a diagram showing an example of the convergence-correcting core recently proposed.

Another arrangement was proposed by the same inventors as the present application as shown in FIG. 5. In the drawing, horizontal and vertical dynamic convergence currents are applied to the windings between inputs A—A' and between inputs B—B' respectively, while static convergence currents are rendered to flow in the windings between inputs C—C' and between inputs D—D'.

The core of this construction has the same capability of dynamic and static convergence correction as that shown in FIG. 3, while eliminating one of the two convergence cores otherwise provided around the neck of the cathode-ray tube.

As another method suggested for effecting dynamic and static convergence on the same core, both the dynamic convergence coil and the static convergence coil may be wound on the same pole piece in the core construction as shown in FIG. 2. In this case, the static convergence coil forms a load on the dynamic convergence circuit due to the fact that the dynamic convergence current is an alternating current. It is, therefore, necessary to employ a high output impedance circuit as the static convergence circuit, complicating the circuit configuration. If the method of correction of static convergence is disregarded, therefore, the construction of FIG. 5 is more preferable.

Actually, in achieving the convergence by use of the core of the construction of FIG. 5, static convergence must be first attained, followed by dynamic convergence alignment. In the course of dynamic convergence alignment, it is ideal that the fixed static convergence is not affected. However, actually, it is displaced to some extent in the direction of vertical or horizontal deflection which is the direction of the dynamic convergence correction. Correction of such a displacement cannot be effected in one operation but requires two operations and therefore, though final correction is available, the processes are complicated, if the core of the construction shown in FIG. 5 is used.

The object of the present invention is to provide a convergence device in which the static convergence is displaceable as well as the dynamic convergence in the same direction as the vertical or horizontal deflection.

In the present invention, convergence alignment is facilitated by use of a single core and a special winding to reduce the volume of the parts around the neck of the cathode-ray tube, thus realizing a compact convergence device easily corrected in convergence and suitable for the television system of the three primary-color projection type.

Furthermore, a shorter convergence yoke can be used, so that the rate of magnification of the electronic lens constituted by the electron guns is reduced leading to a sharper image.

The present invention is intended to further improve the arrangement shown in FIG. 5, by using the core shown therein and to enable to adjust the static convergence in both vertical and horizontal directions of deflection, thus facilitating convergence correction.

Figure 6:
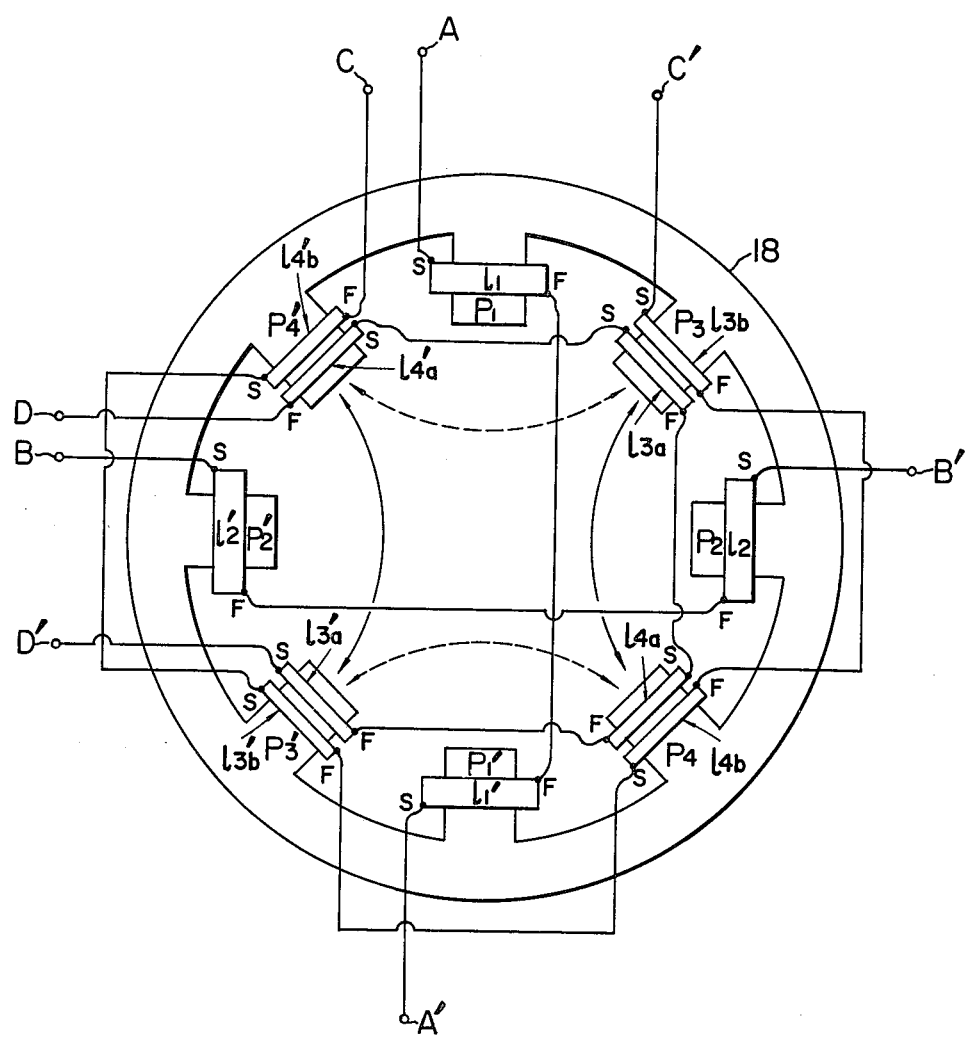
FIG. 6 is a diagram showing the configuration of the convergence device according to an embodiment of the present invention.

An embodiment of the invention is shown in FIG. 6. In the drawing, the shape of a core is the same as that shown in FIG. 5, and the horizontal and vertical dynamic convergence correcting currents are supplied to windings located between A—A' and between B—B' respectively for dynamic convergence alignment. Reference characters S and F show the start and end respectively of each winding on the coil bobbins.

Numeral 18 shows a core; characters $P_1$, $P_1'$, $P_2$, $P_2'$, $P_3$, $P_3'$, $P_4$ and $P_4'$ pole pieces mounted on the inner periphery of the core; and $l_{3a}$, $l_{3b}$, $l_{3'a}$, $l_{3'b}$, $l_{4a}$, $l_{4b}$, $l_{4'a}$ and $l_{4'b}$ independent static convergence windings wound on the respective pole pieces $P_3$, $P_3'$, $P_4$ and $P_4'$.

The dynamic convergence coils $l_1$, $l_1'$, $l_2$ and $l_2'$ are the same as those used in the conventional device and therefore will not be described here.

The static convergence windings $l_{3a}$, $l_{3b}$, $l_{3'a}$, $l_{3'b}$, $l_{4a}$, $l_{4b}$, $l_{4'a}$ and $l_{4'b}$ form two-divided independent windings on the corresponding same pole pieces $P_3$, $P_3'$, $P_4$ and $P_4'$ respectively as shown. Each of the windings has the same number of turns. Between inputs C—C', windings $l_{4'b}$, $l_{3'b}$, $l_{4b}$ and $l_{3b}$ are connected in series, and between inputs D—D', windings $l_{4'a}$, $l_{3a}$, $l_{4b}$ and $l_{3'a}$ are connected also in series.

When a current is supplied between the inputs C and C' in this winding arrangement, a magnetic field is directed in a direction of opposing pole pieces $P_1$—$P_1'$ as shown by the solid lines in the drawing, so that the electron beam passing through the substantial center of the core is deflected laterally. When a current is supplied between the inputs D and D', on the other hand, the direction of a magnetic field is in a direction of opposing pole pieces $P_2$—$P_2'$ as shown by the dotted lines with the result that the electron beam is deflected vertically. In other words, by supplying horizontal and vertical static convergence currents between the inputs C and C' and between the inputs D and D' respectively, static convergence is corrected in vertical and horizontal directions respectively.

Although each of the static convergence windings and the dynamic convergence windings in the embodiment of FIG. 6 is connected in series, they may alternatively be connected in parallel with equal effect.

In the construction shown in FIG. 5, the static convergence windings are wound on each pole piece in the number of N turns. In contrast, each halved part of the winding shown in FIG. 6 has the number of $\frac{1}{2}$N turns. This slightly reduces the deflection sensitivity, but the reduction does not substantially affect the advantages of the invention. With substantially the same bobbin volume, it is possible to change only the direction of convergence correction, so that adjustment of slight static convergence displacement which is caused by dynamic convergence correction is greatly facilitated.

Figure 7:
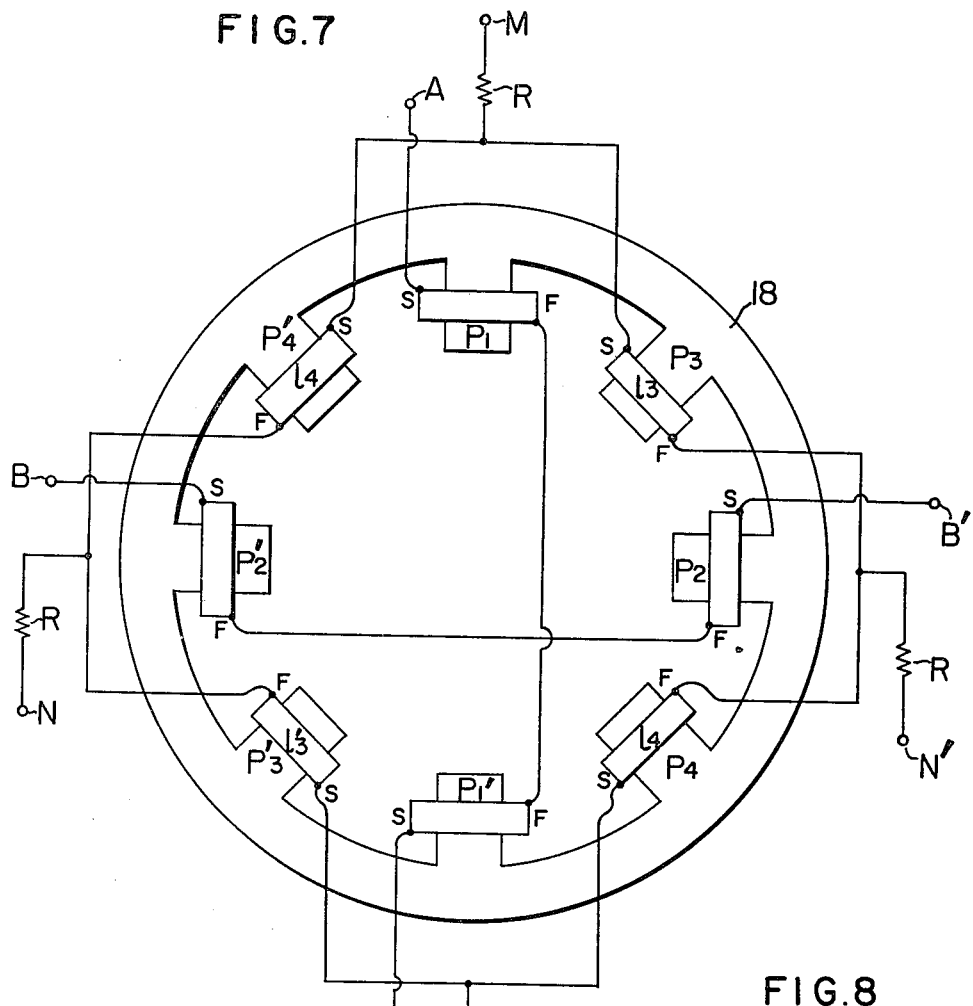
FIG. 7 is a diagram showing another embodiment of the invention.

Another embodiment is shown in FIG. 7. Detailed explanation about the dynamic convergence windings will be omitted as they are the same as those shown in FIG. 6.

Figure 8:
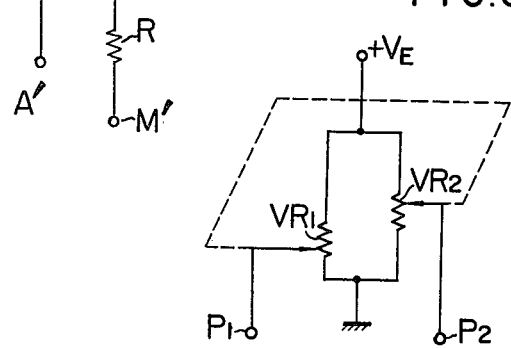
FIG. 8 shows a control circuit used in the device shown in FIG. 7.

As seen from FIG. 7, the embodiment under consideration is such that the windings $l_3$, $l_4$, $l_3'$ and $l_4'$ on the four pole pieces $P_3$, $P_4$, $P_3'$ and $P_4'$ are all connected in series. External current is applied from the connecting point of each adjacent windings through a resistor R sufficiently high in value as compared with the winding resistance. A current control circuit as shown in FIG. 8 is used. In the drawing, $VR_1$ and $VR_2$ show gang variable resistors of the B type having the characteristics of linearly-changing resistance value with rotational angle. Also, they are connected reversely in such a manner that when the electric potential at point $P_1$ rises, that at point $P_2$ drops.

If the points $P_1$ and $P_2$ of this control circuit are inserted between inputs M and M' or between inputs N and N' shown in FIG. 7, it is possible to supply currents in both directions in the coil depending on the position of a slider of the variable resistor $VR_1$ (or $VR_2$ as the case may be). Further, since the current flows through the resistor R sufficiently high in value as compared with the winding resistance, the potential is maintained always at a half of a power source potential $V_E$ applied to the control circuit, or $V_E/2$ at any point of the winding irrespective of the current flowing therein. Therefore, substantially the same effect is attained as in FIG. 6 if two control circuits shown in FIG. 8 are inserted between the inputs M and M' and between the inputs N and N'. The control circuit shown in FIG. 8 may of course be replaced by any of other various types of control circuits.

In FIG. 6, a static convergence-correcting current may be supplied between the inputs A and A' and between the inputs B and B', while supplying a dynamic convergence-correcting current between the inputs C and C' and between the inputs D and D'.

It will be understood from the foregoing description that according to the present invention, displacement of static convergence which is caused as a result of dynamic convergence adjustment is easily corrected to the great practical advantage.

What we claim is:

1. A convergence device for the projection type color television system wherein a plurality of primary-color images are projected by respectively different cathode-ray tubes to obtain a color picture on a screen comprising:

a substantially ring-shaped convergence core mounted around a neck of each of said cathode-ray tubes, eight pole pieces provided on the inner surface of said core, said eight pole pieces being aligned in pairs along a first axis passing through the center of said ring-shaped core, a second axis perpendicularly intersecting with said first axis, and third and fourth axes each dividing into two halves the angle between said first and second axes, said third and fourth axes intersecting perpendiculary with each other, a first two pairs of windings respectively disposed around a first two pairs of pole pieces ($P_1$—$P_1'$, $P_2$—$P_2'$) the axes thereof intersecting perpendicularly, said two pairs of windings being adapted upon excitation to produce magnetic fields respectively in directions along the opposing pole pieces ($P_1$—$P_1'$) and along the other opposing pole pieces ($P_2$—$P_2'$), and a second two pairs of windings respectively disposed around the remaining second two pairs of pole pieces ($P_3$—$P_3'$, $P_4$—$P_4'$), said second two pairs of windings being adapted when excited with a current flowing therethrough to produce magnetic fields respectively in the directions along said first two pairs of pole pieces ($P_1$—$P_1'$, $P_2$—$P_2'$) the axes thereof intersecting perpendicularly, the strength of said two sets of magnetic fields produced by said first two pairs of windings and said second two pairs of windings being controllable independently from each other along the two orthogonal directions, one of said two sets of magnetic fields being controlled by a static convergence control signal, and the other controlled by a dynamic convergence control signal.

2. A convergence device as claimed in claim 1, wherein said second two pairs of windings around said second pairs of pole pieces ($P_3$—$P_3'$, $P_4$—$P_4'$) are formed by a first two independent windings ($l_{3a}$, $l_{3b}$), a second two independent windings ($l_3'a$, $l_3'b$), a third two independent windings ($l_{4a}$, $l_{4b}$), and a fourth two independent windings ($l_4'a$, $l_4'b$) respectively disposed around the pole pieces ($P_3$, $P_3'$, $P_4P_4'$), and wherein a first group of the independent windings ($l_{3a}$, $l_3'a$, $l_{4a}$, $l_4'a$) are connected with each other thereby to produce the magnetic field along the direction of the pole pieces ($P_1$—$P_1'$, or $P_2$—$P_2'$), and the remaining independent windings ($l_{3b}$, $l_3'b$, $l_{4b}$, $l_4'b$) are connected with each other thereby to produce the magnetic field along the pole pieces ($P_2$—$P_2'$ or $P_1$—$P_1'$).

3. A convergence device as claimed in claim 1, wherein said second pairs of windings on the pole pieces ($P_3$—$P_3'$, $P_4$—$P_4'$) and connected in series, and wherein four input terminals (M, M', N, N') are respectively connected through resistors (R) to junction points between adjacent windings, and wherein each pair of said input terminals connected to junction points located in a symmetrical relation with respect to the core center is supplied with a current by varying electrical potentials of said each pair of input terminals differentially with respect to the same reference potential.

* * * * *